United States Patent [19]

Bittner et al.

[11] 4,328,010
[45] May 4, 1982

[54] PROCESS FOR THE RECOVERY OF PURE CYANOGEN CHLORIDE

[75] Inventors: Friedrich Bittner, Bad Soden; Werner Heimberger, Hanau; Kurt Henkel, Rodermark; Norbert Kriebitzsch, Hammersbach; Martin Petzold, Bad Homburg; Kurt Puschner, Rodenbach, all of Fed. Rep. of Germany

[73] Assignee: Degussa Aktiengesellschaft, Frankfurt, Fed. Rep. of Germany

[21] Appl. No.: 174,180

[22] Filed: Jul. 31, 1980

[30] Foreign Application Priority Data

Aug. 2, 1979 [DE] Fed. Rep. of Germany ...... 2931353

[51] Int. Cl.³ .............................................. B01D 53/14
[52] U.S. Cl. .............................................. 55/51; 55/71; 203/42; 203/96; 423/383
[58] Field of Search ....................... 55/51, 71; 202/182–184, 234; 203/42, 96; 423/383

[56] References Cited

U.S. PATENT DOCUMENTS

| 1,588,731 | 6/1926 | Heuser | 423/383 |
|---|---|---|---|
| 2,672,398 | 3/1954 | Huemer et al. | 423/383 |
| 3,197,273 | 7/1965 | Trickey | 423/383 |
| 3,488,919 | 1/1970 | Schreyer et al. | 55/38 |
| 3,562,776 | 2/1971 | Riethmann et al. | 62/28 |
| 3,568,408 | 3/1971 | Riethmann et al. | 55/71 |
| 3,593,494 | 7/1971 | Durrell et al. | 55/71 X |
| 3,607,671 | 9/1971 | Riethmann et al. | 203/42 X |
| 3,607,872 | 9/1971 | Riethmann | 423/383 X |
| 3,607,873 | 9/1971 | Ferguson et al. | 423/383 X |
| 3,839,159 | 10/1974 | Dunnavant et al. | 202/183 X |
| 3,947,552 | 3/1976 | Geiger et al. | 423/383 X |
| 3,949,060 | 4/1976 | Geiger et al. | 423/383 X |
| 4,046,862 | 9/1977 | Heimberger et al. | 423/383 |
| 4,255,167 | 3/1981 | Babb et al. | 55/71 |

FOREIGN PATENT DOCUMENTS

| 827358 | 1/1952 | Fed. Rep. of Germany . |
|---|---|---|
| 1009603 | 6/1957 | Fed. Rep. of Germany . |
| 1271091 | 6/1968 | Fed. Rep. of Germany . |
| 1900972 | 9/1969 | Fed. Rep. of Germany . |
| 2045823 | 4/1971 | Fed. Rep. of Germany . |
| 2045786 | 5/1971 | Fed. Rep. of Germany . |
| 2363866 | 9/1975 | Fed. Rep. of Germany . |

OTHER PUBLICATIONS

Branajew, Chem. In. Moskau 44, (1968), p. 5.

*Primary Examiner*—Robert H. Spitzer
*Attorney, Agent, or Firm*—Cushman, Darby & Cushman

[57] ABSTRACT

To obtain a cyanogen chloride which is practically free from water and preferably also free from hydrogen cyanide, hydrogen chloride and organic compounds, the crude cyanogen chloride is fractionally distilled. The return is led in countercurrent flow to the crude gas, thereby takes up the impurities and is further evaporated in the lower portion of the column, respectively in a special apparatus, by a liquid whose temperature is higher than the boiling temperature of cyanogen chloride. Thereby this liquid also takes up the impurities. The purification action is aided by a wash for the crude cyanogen chloride connected in series before it enters the fractionating column. It is very advantageous to combine the process with a plant for the production of cyanogen chloride.

16 Claims, 2 Drawing Figures

PROCESS FOR THE RECOVERY OF PURE CYANOGEN CHLORIDE

BACKGROUND OF THE INVENTION

Cyanogen chloride is a valuable intermediate product, chiefly for the production of guanidines and cyanuric chloride. In these and other processes the purity of the cyanogen chloride is of decisive significance.

Thus, e.g. a content of free chlorine in the cyanogen chloride acts disturbingly in the production of guanidines, while in the catalytic trimerization of cyanogen chloride to cyanuric chloride above all water, hydrogen cyanide and organic vapors are disturbing because they act as catalyst poisons; on the other hand a certain content of free chlorine is favorable.

Industrial cyanogen chloride can contain among others hydrogen cyanide, hydrogen chloride, chlorine, water, carbon dioxide, nitrogen and organic hydrocarbons either individually or in admixture with each other.

In the methods used in the art for the production of cyanogen chloride by reaction of hydrogen cyanide and chlorine in aqueous medium, see e.g. German Pat. No. 827,358, Heuser U.S. Pat. No. 1,588,731 and Trickey U.S. Pat. No. 3,197,273, it is generally easy to carry out the process in such fashion that the cyanogen chloride, in case it is desired, is obtained practically without substantial free chlorine impurities on the other hand, e.g., according to German OS No. 2521580 there can be obtained cyanogen chloride containing chlorine.

The water content in the cyanogen chloride is the cause of catalyst poisoning in the trimerization and of other unpleasant reactions since water causes the saponification of cyanogen chloride to ammonium chloride in which case the hydrolysis is still further accelerated by the presence of hydrogen chloride. As is known, ammonium chloride can lead to powerful explosions through the formation of nitrogen trichloride.

Therefore there have been proposed a number of purification or drying processes for removal of water from industrial cyanogen chloride. They all require for removal of the water content additional expense in the form of drying towers with drying agents or molecular sieves, which must regularly be loaded or regenerated, in the case where this is in general possible, which require expense for energy and operating and let waste air or waste water be formed. The water content in cyanogen chloride attainable with drying agents is between 0.05 and 0.2 weight %.

The purpose of the invention is to develop a distillation process for the purification of crude water, containing cyanogen chloride.

SUMMARY OF THE INVENTION

It has now been found that crude cyanogen can be purified distillatively if the crude cyanogen chloride gas is supplied directly, or preferably after a washing with water, aqueous solution, or organic liquids, in a fractionating column, preferably in its lower portion, fractionately distilled and the returning condensed cyanogen chloride evaporated again through direct contact with a vaporizer liquid in which case the vaporizer liquid consists of water or an aqueous solution whose temperature is above the boiling temperature of the cyanogen chloride at the pressure prevailing in the column, which simultaneously dissolves impurities out of the condensed cyanogen chloride and which is present in such an amount that the returning cyanogen chloride again evaporates, whereby by removing the entire amount or a part of the aqueous solution the concentration of impurities is held to the desired level.

Of course there have already been described cyanogen chloride mixtures of cyanogen chloride and hydrogen cyanide, hydrogen chloride and water whose vapor phase contains about 0.05 weight % of water, see M. K. Baranajew and coworkers, Chem. In. Moskow 44(1968) page 5. However, this is only concerned with a phase equilibrium investigation of a few hours in the laboratory.

In the industrial world there exists considerable hesitation to use a distillative purification for industrial cyanogen chloride, since there is feared both the trimerization of the cyanogen chloride to cyanuric chloride and also the saponification of the cyanogen chloride to ammonium chloride with all the consequences (among others formation of nitrogen trichloride). Additionally in continuous operation there exists, besides the chemical dangers, in solids formation in the column parts continuously recurring operation interruptions through encrustations and cloggings with all of the known industrial disadvantages.

Trimerization above all is to be expected where the system "water in cyanogen chloride" is present together with acid impurities, with other words, in the rectification part of a column with a throughput of liquid cyanogen chloride which contains wet chlorine, hydrogen cyanide, and hydrogen chloride. Thus reference is made in German AS No. 1900972, col. 4 and Riethmann U.S. Pat. No. 3,562,776 to the fact that hydrogen chloride and chlorine extraordinarily strongly catalyze the trimerization to cyanuric chloride even in the cold if water is not completely excluded.

The saponification of cyanogen chloride to ammonium chloride, which is not soluble in liquid cyanogen chloride, would likewise lead to cloggings within the column and in case chlorine is contained in the cyanogen chloride cause the formation of explosive nitrogen trichloride.

This was probably the reason why those skilled in the art went to other ways of drying cyanogen chloride and tried with the help of absorption or adsorbents to at least remove the water from the industrial cyanogen chloride, see German OS No. 2045823, German OS No. 2045786 as well as German Pat. No. 2363866 and related Geiger U.S. Pat. No. 3,947,552 and German Pat. No. 2363867 and related Geiger U.S. Pat. No. 3,949,966.

In the continuous carrying out of the distillative purification of cyanogen chloride in the customary type of distillation there must be accumulated easily volatile hydrogen chloride in the column and therewith the danger of saponification of cyanogen chloride and the dangers dependent thereon.

However, if according to the process of the invention the heating and vaporization of the cyanogen chloride return, which must be maintained for the fractionation and separation of the water, does not take place by means of a closed heat exchanger but takes place through direct contact with a heat transferring, aqueous liquid, then with the mixing all disturbing impurities, above all hydrogen chloride, ammonium chloride and organic hydrocarbons can be dissolved by this liquid and discharged from the column before it can amount to an effective concentration in the condensed cyanogen chloride. As vaporizer liquids, as stated, there can be used water or aqueous solutions, such as e.g. solutions containing hydrochloric acid. Above all there is the interesting possibility of joining a hydrochloric acid solution, as it is obtained in the process for production of cyanogen chloride with the process of the invention. Preferably such a solution always contain a certain excess of hydrogen cyanide, see e.g. German Pat. No. 827358.

The amount of aqueous evaporator liquid depends on the number of heat transfer units as is customary with evaporators; it is used simultaneously to carry off the disturbing impurities and to revaporize the cyanogen chloride return in an overflow vessel or a flow vessel having a temperature of above 15° C., preferably 40°–60° C.

The time of the action of the warm, aqueous solution on the cyanogen chloride is so short and the saponification resulting here and in the fractionation so slight that the content of ammonium chloride even in using water at 50° C. containing about 10% hydrogen chloride, as is obtained in the production of cyanogen chloride, is below 0.1 weight % ammonium chloride based on the vaporizer liquid.

If free chlorine is present in the crude cyanogen chloride then there is additionally maintained in the vaporizer solution via a customary control system a continuous hydrogen cyanide content of 0.1 to 1 weight % hydrogen cyanide. In this way it is possible to avoid the accumulation of nitrogen trichloride in the evaporator solution even with large fractions of chlorine (e.g. in operation disturbances) in the cyanogen chloride.

For rectification of the cyanogen chloride according to the process of the invention there are needed at least 10 theoretical plates (TP), preferably 15–30 theoretical plates at a reflux ratio D/R=1:1 to 1:10, preferably 1:1.5 to 1:3. Thereby the fractionating part can have all customary forms, such as bubble plates, perforated plates, etc. Preferably there is used packing. As reflux condensers there can be used all of the customary forms, above all tube bundle heat exchangers of graphite containing materials or tantalum. Fractionation is operated at a pressure of 1–2 bar measured on the top of the column. As the product there is obtained a cyanogen chloride gas whose water content is below 0.1 weight %, as a rule 0.05 weight % and which is practically free from organic materials and hydrogen chloride.

The chlorine content of the purified, practically water-free cyanogen chloride depends on the chlorine content of the crude cyanogen chloride which is fed into the column and without any danger can amount to up to 20 volume %.

The hydrogen cyanide is likewise depleted in the top (head) product. However, since the boiling point of hydrogen cyanide (B.P. 27° C.) and cyanogen chloride (B.P. 13.5° C.) lie relatively close together for the more economical depletion of the hydrogen cyanide this is removed from the gas up to less than a few tenths % by absorption in a washing liquid and the rectification used only for elimination of the residual content of hydrogen cyanide, as well for the separation of water. Through this procedure at equal effectiveness the number of theoretical plates can be held small and, as above mentioned is preferably 18 theoretical plates at a reflux ratio of D/R preferably 1:1.5 to 1:3, while a separation by pure distillation of the hydrogen cyanide would require additional rectification plates.

As washing liquids for the crude cyanogen chloride before the rectification there can be used water or aqueous solutions containing cyanogen chloride, e.g. water from tail gas scrubbers of the trimerization process of cyanogen chloride, or alkyl aromatic hydrocarbons, e.g. dodecylbenzene according to German Pat. No. 1271091 and related Schreyer U.S. Pat. No. 3,488,619. These liquids are used either by passing through or with partial recycling. The entire disclosure of the Schreyer U.S. patent is hereby incorporated by reference and relied upon. In using water or cyanogen chloride containing aqueous solutions it is suitable to allow the content of hydrogen cyanide and hydrogen chloride not to substantially increase above 0.5 to 1.0 weight % each. Below this limit the solutions are usable for the washing.

The temperature of the washing liquids should be between 15° and 25° C.

The individual process steps, rectification with partial condensation and revaporization, as well as in a given case, washing, can be carried out in separate apparatuses which are joined together with piping.

Figure 1:
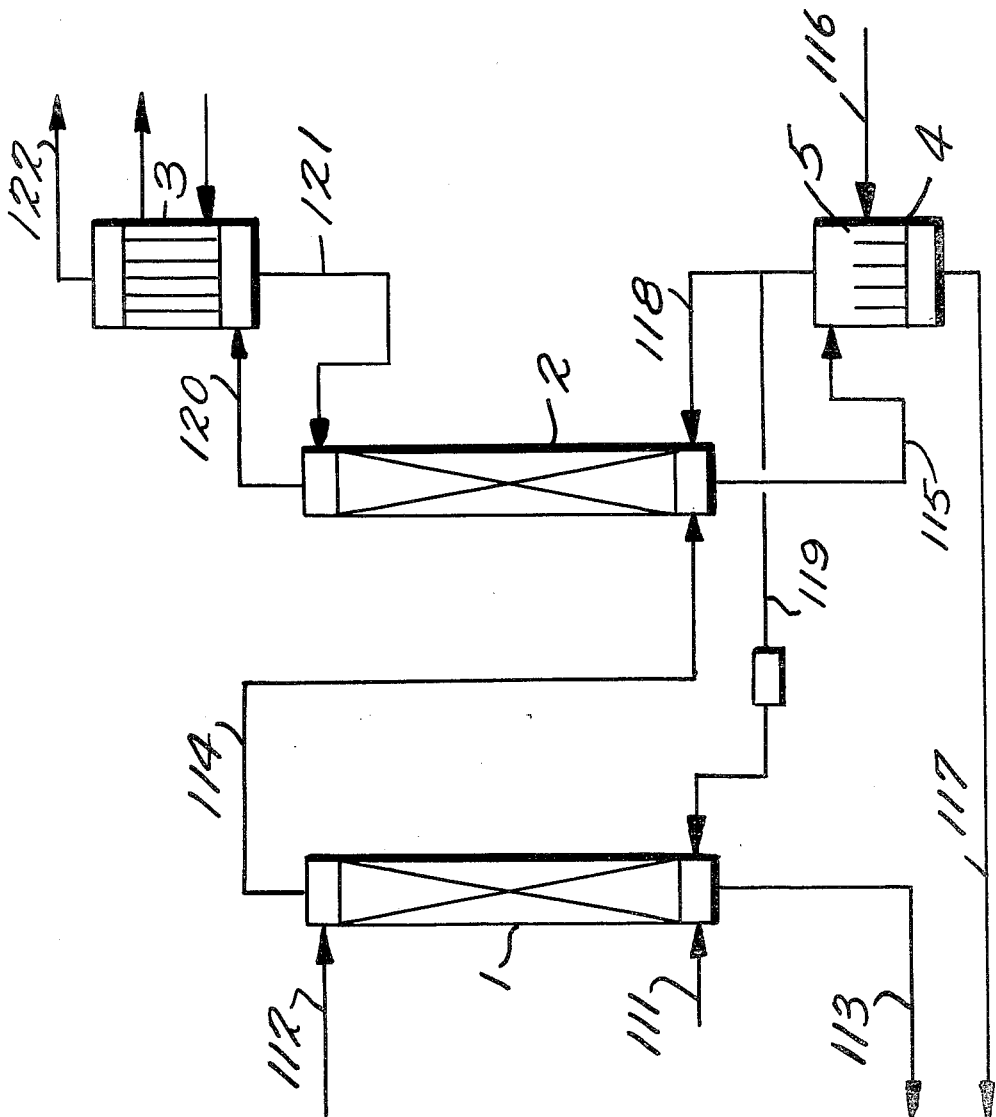
FIG. 1 illustrates in diagrammatic form one form of the invention.

Referring more specifically to FIG. 1 of the drawings the individual process steps, rectification with partial condensation and revaporization as well as washing are carried out in separate apparatuses connected by piping. The crude cyanogen chloride gas enters washing column 1 through line 111. This column is fed with wash water via line 112. The laden water leaves the column 1 via line 113.

The washed cyanogen chloride flows through line 114 into the rectification column 2 in which a reflux is produced by partial condensation in the condenser 3.

The liquid cyanogen chloride flows via line 115 into the evaporator or vaporizer 4. According to the invention this evaporator consists of an overflow container having overflow weirs 5 in which the cyanogen chloride is contacted with the vaporizer liquid supplied through line 116. The temperature of the vaporizer liquid e.g. water at about 50° C. is above the boiling point of the cyanogen chloride and the vaporizer liquid has a sufficiently large heat content to vaporize the cyanogen chloride. In this case the revaporized cyanogen chloride is fed back via line 118 to the rectification column 2.

If, as mentioned above, there is used a solution containing hydrochloric acid and, in a given case, hydrogen cyanide as is obtained in a process for the production of cyanogen chloride then the revaporized cyanogen chloride is preferably returned via line 119 into the washing column 1 in order to be freed from entrained hydrogen cyanide. The liquid from line 116 cooled by the abstraction of heat of vaporization flows via line 117 out of vaporizer 4. The liquids from the lines 113 and/or 117 can be recycled into the process for the production of cyanogen chloride and can serve there to maintain the hydrochloric acid content at the desired value during the production of cyanogen chloride.

The cyanogen chloride freed from injurious materials leaves the rectification column 2 through line 120, is partially returned into the rectification column 2 as reflux via line 121, partially supplied as gaseous product via line 122 to further use, e.g. a trimerization.

The eventual water washing of the cyanogen chloride in washing column 1 takes place in a manner known of itself in countercurrent flow, e.g. in a spray tower or in a plate-type column.

Figure 2:
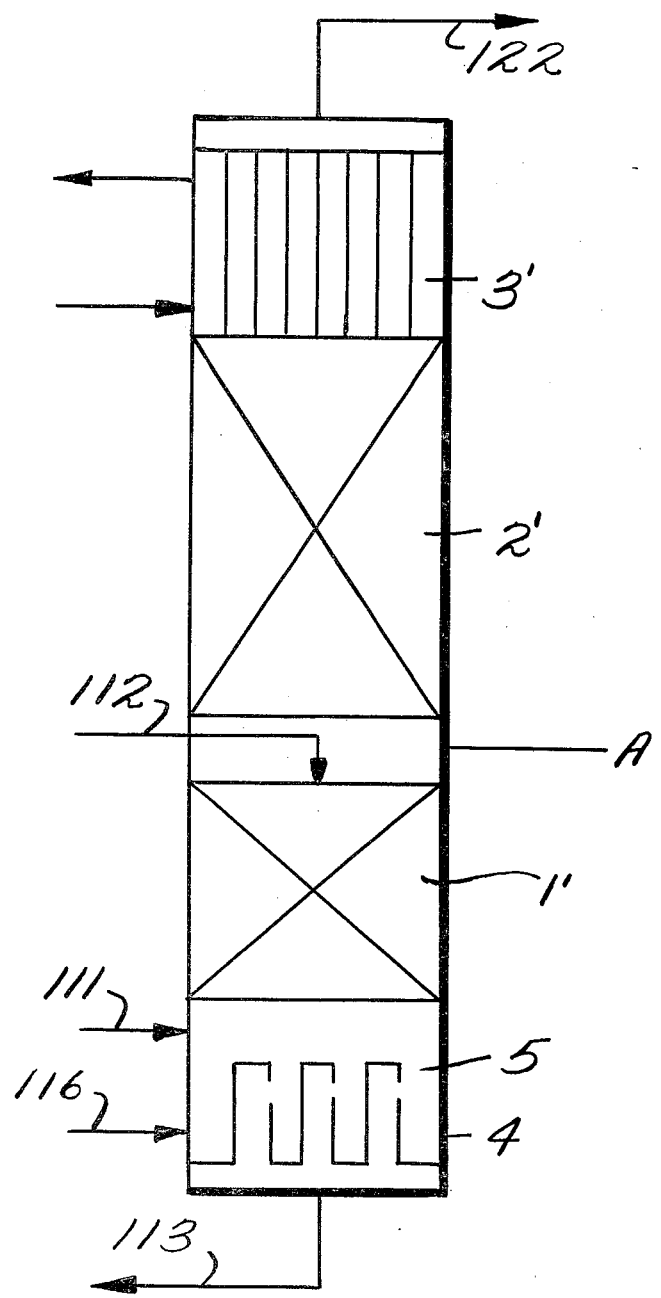
FIG. 2 is a diagrammatic illustration of another form of the invention.

There is also employed another form of the invention in which an apparatus for the individual steps is combined in a column type structure, e.g. as is shown in FIG. 2. Therein the crude cyanogen chloride gas enters device A of the invention through the line 111 and is washed, e.g. with water, while rising in section 1' which water enters via line 112. The gas then flows through section 2' in which it is contacted with liquid cyanogen chloride, which is produced in the condenser 3'. The purified cyanogen chloride flows out through the line 122. The cyanogen chloride reflux percolates through the washing section 1' and goes into the vaporizer 4 with overflow 5 in which it comes into contact with e.g. warm water or also the warm recycling solution used in the production of the crude cyanogen chloride and again vaporizes. This medium is fed in via line 116 and leaves the combined column through line 113.

The advantage of this alternative form of the apparatus for the purification of crude cyanogen chloride by rectification is that by elimination of the connecting lines, whose materials of construction and seals are susceptible to trouble in operation, the large scale production of purified cyanogen chloride is substantially safer in operation.

The amount of reflux is regulated in known manner in this arrangement via the heat flow measured in the cooling water. As wash water (via line 112) there can also serve, as stated above, cyanogen chloride containing aqueous solutions.

As mentioned above, there can be used as vaporization liquid the hydrochloric acid solution from a process for the production of cyanogen chloride through which, in particularly economical manner, the heat of reaction from the process of production is transferred into vaporization heat of the cyanogen chloride reflux and therethrough the stream discharging via line 113, and in a given case recycled to the process of production of cyanogen chloride, is cooled off.

The stream from line 112 used as washing liquid combines in overflow vessel 4 with the stream from line 116. Suitably there is used as wash water exactly the amount which gives the optimal amount and concentration after the combination with the mass flow 116, as desired for a recycling to the process of production of cyanogen chloride. In a given case this returning stream is still further cooled in a heat exchanger (not shown).

Unless otherwise indicated all parts and percentages are by weight. The process can comprise, consist essentially of or consist of the steps set forth with the stated materials.

The following examples further explain the process of the invention.

DESCRIPTION OF THE PREFERRED EMBODIMENTS

EXAMPLE 1 (WITHOUT WASHING)

Cyanogen chloride was rectified in a column 2 analogous to FIG. 1, but without washing apparatus, on a packed column having a diameter of 150 mm and height of 3200 mm at a reflux ratio of 1:3.2. The reflux ratio was regulated with a magnetically controlled diverter. As vaporizer there was employed a spherical vessel having an overflow which was fed with 1900 l/h of water having a temperature of 40° C. The vaporizer liquid, i.e. the water, was drawn off with a temperature of 34° C. The column was supplied with 37 kg/h of cyanogen chloride whose composition before and after the rectification is seen from the following table (results in weight %).

|  | ClCN | H$_2$O | Cl$_2$ | HCN | Inerts |
|---|---|---|---|---|---|
| Stream 114 | 96.25 | 1.60 | 0.01 | 0.94 | 1.20 |
| Stream 122 | 98.60 | 0.04 | 0.01 | 0.12 | 1.23 |

The inert gas consists practically exclusively of carbon dioxide and nitrogen.

EXAMPLE 2 (WITH WASHING)

Cyanogen chloride was washed with 120 l/h of water in a column 1 analogous to FIG. 1 with the washing device 1 portrayed there, the column being a packed column having a diameter of 150 mm and a height of 2400 mm and then the cyanogen chloride was rectified in a packed column having a diameter of 150 mm and a height of 3200 mm. The vaporizer was operated with 1900 l/h of water having a temperature of 50° C. The column was supplied with 31 kg/h of cyanogen chloride whose composition before and after the rectification is seen from the following table:

|  | ClCN | H$_2$O | Cl$_2$ | HCN | Inerts | C$_6$H$_6$ |
|---|---|---|---|---|---|---|
| Stream 114 | 98.03 | 0.80 | 0.00 | 0.16 | 0.96 | 0.05 |
| Stream 122 | 98.95 | 0.05 | 0.00 | 0.03 | 0.97 | <0.01 |

EXAMPLE 3 (WITH WASHING)

In an experiment analogous to Example 2 there was used wash water which contained 0.1 weight % of free chlorine. The cyanogen chloride was enriched with a part of the chlorine and so passed to the rectification. The composition of the gas before and after the rectification is seen from the following table:

|  | ClCN | H$_2$O | Cl$_2$ | HCN | Inerts |
|---|---|---|---|---|---|
| Stream 114 | 96.75 | 0.70 | 1.50 | 0.07 | 0.98 |
| Stream 122 | 97.42 | 0.07 | 1.51 | 0.01 | 0.99 |

EXAMPLE 4 (WITH WASHING)

In a large scale test in a manner analogous to FIG. 2 there were put through in a combined washing and rectification column of graphite containing material the following streams:

Wash water 1200 l/h, vaporizer liquid 12,000 l/h, crude cyanogen chloride 500 kg/h. The reflux ratio was 1:2.5, it was established in a condenser by controlling the heat flow in the cooling water. The vaporizer liquid consisted of 86.5% water, 3% cyanogen chloride, 0.5% hydrogen cyanide, 10% hydrogen chloride, 0.05% ammonium chloride and entered at a temperature of 45° C. The washing liquid (water) had a temperature of 20° C. The composition of the cyanogen chloride before and after the column is seen from the following table:

|          | ClCN  | H₂O  | Cl₂  | HCN  | Inerts |
|----------|-------|------|------|------|--------|
| Stream 111 | 96.25 | 1.64 | 0.01 | 1.14 | 0.96   |
| Stream 122 | 98.94 | 0.05 | 0.00 | 0.02 | 0.99   |

The liquid discharged from the column having a temperature of 33° C. was further cooled in a cooler attached directly below the evaporator vessel and returned again to the process for the production of cyanogen chloride; the concentration of ammonium chloride had been reduced by the added wash water, the absolute amount of ammonium chloride had not changed.

The entire disclosure of German priority application No. P 2931353.9-44 is hereby incorporated by reference.

What is claimed is:

1. A process for the purification of crude cyanogen chloride by fractional distillation comprising introducing the crude cyanogen chloride into a fractionating column, fractionally distilling the cyanogen chloride, again revaporizing the returning condensed cyanogen chloride by direct contact with a vaporizer liquid consisting of water or an aqueous solution whose temperature is above the boiling temperature of the cyanogen chloride at the prevailing column pressure which simultaneously dissolves the impurities out of the condensed cyanogen chloride and which vaporizer liquid is present in such an amount that the returning cyanogen chloride is again vaporized and removing at least a portion of the aqueous solution to maintain the impurities at the desired level.

2. The process according to claim 1 wherein the crude cyanogen chloride is washed with water, an aqueous solution, or an organic liquid before being supplied to the fractionating column.

3. The process of claim 2 wherein the crude cyanogen chloride is introduced into the lower portion of the fractionating column.

4. The process of claim 2 wherein the fractional distillation is carried out at a pressure of 1-2 bar measured on the top of the column.

5. The process of claim 4 wherein the distillation is carried out at a reflux ratio of 1:1 to 1:10 in a column having at least 10 theoretical plates.

6. The process of claim 4 wherein the distillation is carried out at a reflux ratio of 1:1.5 to 1:3 in a column having 15-30 theoretical plates.

7. The process of claim 2 wherein the distillation is carried out at a reflux ratio of 1:1 to 1:10 in a column having at least 10 theoretical plates.

8. The process of claim 7 wherein the vaporizer liquid has a temperature of at least 15° C.

9. The process of claim 8 wherein the vaporizer liquid has a temperature of 40°-60° C.

10. The process of claim 2 wherein the distillation is carried out at a reflux ratio of 1:1.5 to 1:3 in a column having 15-30 theoretical plates.

11. The process of claim 2 wherein the vaporizer liquid employed is the solution obtained by producing cyanogen chloride from hydrogen cyanide and chlorine in aqueous solution.

12. The process of claim 11 wherein the crude cyanogen chloride gas before the fractional distillation is washed with water having a temperature of 15°-20° C. until it is practically free from hydrogen chloride and hydrogen cyanide.

13. The process of claim 2 wherein the crude cyanogen chloride gas before the fractional distillation is washed with water having a temperature of 15°-20° C. until it is practically free from hydrogen chloride and hydrogen cyanide.

14. The process of claim 2 wherein free chlorine is present in the crude cyanogen chloride and there is maintained in the vaporizer liquid at least 0.1 weight % of hydrogen cyanide.

15. The process of claim 1 wherein the fractional distillation is carried out at a pressure of 1-2 bar measured on the top of the column.

16. The process of claim 1 wherein the distillation is carried out at a reflux ratio of 1:1 to 1:10 in a column having at least 10 theoretical plates.

* * * * *